US012677309B2

(12) United States Patent
Tripathi et al.

(10) Patent No.: US 12,677,309 B2
(45) Date of Patent: Jul. 7, 2026

(54) SYSTEM, METHOD AND COMPUTER PROGRAM FOR INTELLIGENT NON-STANDALONE TRAFFIC FLOW

(71) Applicant: RAKUTEN MOBILE, INC., Tokyo (JP)

(72) Inventors: Sandeep Mani Tripathi, Tokyo (JP); Vaibhav Pradhan, Tokyo (JP); Krishnan Venkataraghavan, Tokyo (JP); Avinash Aithal, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 1199 days.

(21) Appl. No.: 17/630,759

(22) PCT Filed: Dec. 28, 2021

(86) PCT No.: PCT/US2021/065281

§ 371 (c)(1),
(2) Date: Jul. 6, 2023

(87) PCT Pub. No.: WO2023/129128

PCT Pub. Date: Jul. 6, 2023

(65) Prior Publication Data

US 2024/0040603 A1    Feb. 1, 2024

(51) Int. Cl.
*H04W 72/542*    (2023.01)
*H04B 17/318*    (2015.01)
*H04W 72/12*    (2023.01)

(52) U.S. Cl.
CPC ........ *H04W 72/542* (2023.01); *H04B 17/328* (2023.05); *H04W 72/12* (2013.01)

(58) Field of Classification Search
CPC ... H04W 72/542; H04W 72/12; H04B 17/328
See application file for complete search history.

(56) References Cited

U.S. PATENT DOCUMENTS

2019/0357264 A1*  11/2019  Yi ......................... H04L 5/0023
2021/0022073 A1*   1/2021  Kwok ................... H04W 72/21

FOREIGN PATENT DOCUMENTS

CN              110199497 B   *  11/2022  ............. H04L 5/001
EP              3840526 A1   *   6/2021  ............. H04W 72/21
WO    WO-2019099463 A1   *   5/2019  ............. H04W 36/06
WO    WO-2020164855 A1   *   8/2020  ............. H04W 72/54
WO    WO-2020221110 A1   *  11/2020  ......... H04W 36/304

OTHER PUBLICATIONS

International Search Report dated Mar. 22, 2022 in International Application No. PCT/US2021/065281.
Written Opinion of the International Searching Authority dated Mar. 22, 2022 in International Application No. PCT/US2021/065281.

* cited by examiner

*Primary Examiner* — Saad A. Waqas
(74) *Attorney, Agent, or Firm* — Sughrue Mion, PLLC

(57) ABSTRACT

A method, system and non-transitory computer-readable medium are provided. The method includes determining that a user equipment (UE) is camped on a new radio (NR) cell and to a long term evolution (LTE) cell, determining a reference signal received power (RSRP) of the LTE cell, determining an RSRP of the NR cell, and assigning an uplink data flow configuration for the UE based on the RSRP of the LTE cell and the RSRP of the NR cell.

20 Claims, 8 Drawing Sheets

600

602 — Determine that a UE is camped to a NR cell and an LTE cell.

604 — Determine an RSRP of the LTE cell.

606 — Determine an RSRP of the NR cell.

608 — Assign an uplink data flow configuration for the UE based on the RSRP of the LTE cell and the RSRP of the NR cell.

SYSTEM, METHOD AND COMPUTER PROGRAM FOR INTELLIGENT NON-STANDALONE TRAFFIC FLOW

BACKGROUND

1. Field

The disclosure relates to a system, method and device for traffic flow adjustment in a network environment.

2. Description of Related Art

A network environment may include a long term evolution (LTE) base station and a new radio (NR) base station (e.g., a $5^{th}$ generation (5G) base station). In a non-standalone (NSA) network model of 5G deployment, 5G services are provided without an end-to-end 5G network, but instead use an LTE core network for control functions (such as signaling). That is, the 5G Radio Access Network (RAN) and its NR base station are used in conjunction with the LTE core network. In this context, user equipment (UE) that supports Evolved Universal Terrestrial Radio Access Network (E-UTRAN) New Radio Dual Connectivity (ENDC) can connect simultaneously to (or camp on) both an LTE cell and an NR cell. However, as the UE moves throughout the network environment, the conditions for transmitting uplink data and receiving downlink data may change. Thus, processes that adapt to the changing conditions are desired.

SUMMARY

According to an aspect of the disclosure, a method may include determining that a user equipment (UE) is camped on a new radio (NR) cell and on a long term evolution (LTE) cell, determining a reference signal received power (RSRP) of the LTE cell, determining an RSRP of the NR cell, and assigning an uplink data flow configuration for the UE based on the RSRP of the LTE cell and the RSRP of the NR cell.

According to an aspect of the disclosure, a system may include a memory configured to store instructions and one or more processors configured to execute the instructions to determine that a UE is camped on a NR cell and to an LTE cell, determine an RSRP of the LTE cell, determine an RSRP of the NR cell, and assign an uplink data flow configuration for the UE based on the RSRP of the LTE cell and the RSRP of the NR cell.

According to an aspect of the disclosure, a non-transitory computer-readable medium may store instructions, and the instructions may include one or more instructions that, when executed by one or more processors of a wireless communication system, cause the one or more processors to determine that a UE is camped on a NR cell and to an LTE cell, determine an RSRP of the LTE cell, determine an RSRP of the NR cell, and assign an uplink data flow configuration for the UE based on the RSRP of the LTE cell and the RSRP of the NR cell.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
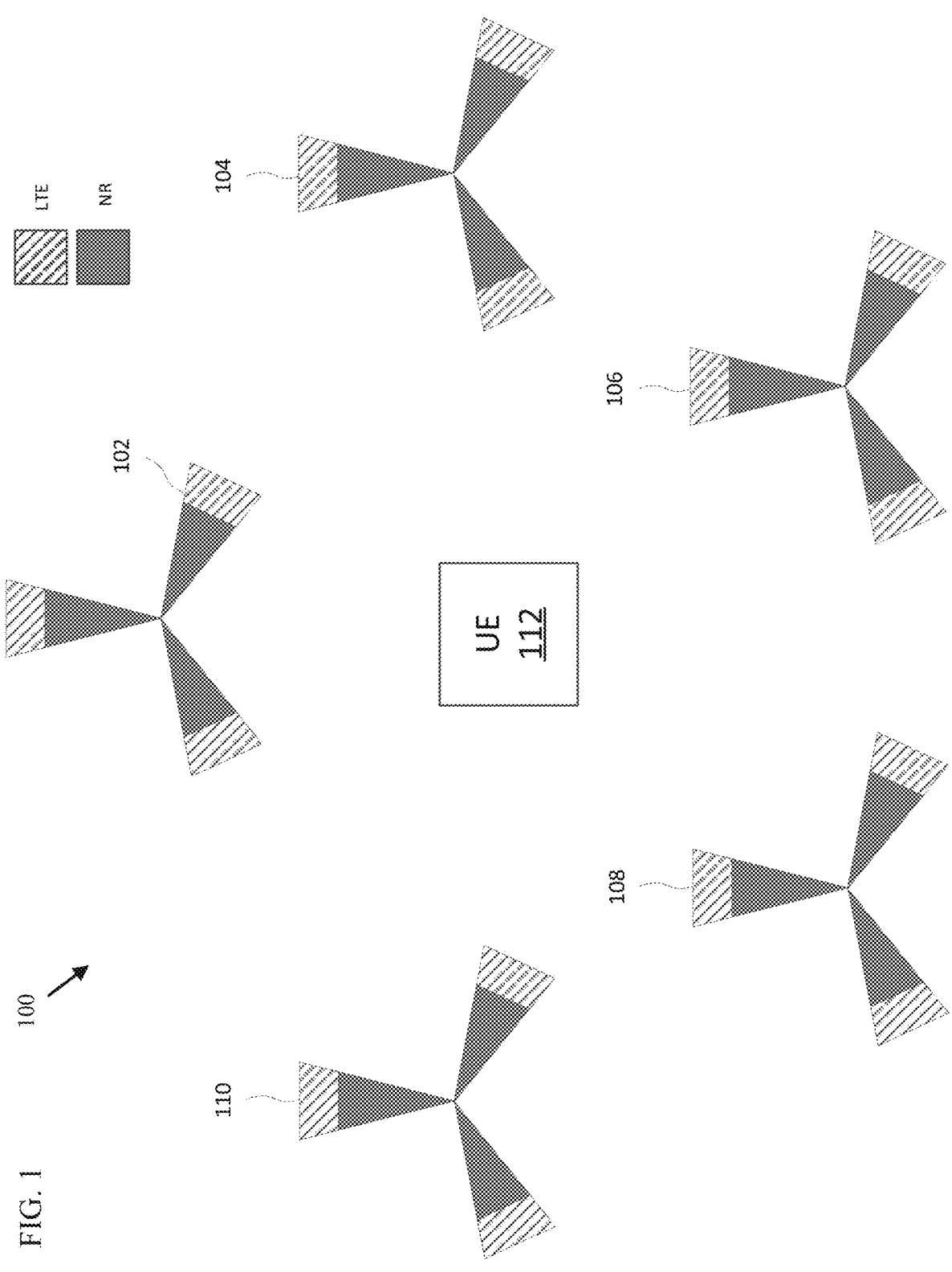
FIG. 1 is a diagram of an overall network environment, according to an embodiment.

FIG. 1 is a diagram of an overall network environment 100 according to an embodiment. The network environment 100 may include multiple coverage areas 102-110. Each coverage area may include a long term evolution (LTE) base station and a new radio (NR) base station. A user equipment (UE) 112 may enter any of the coverage areas 102-110.

Figure 2:
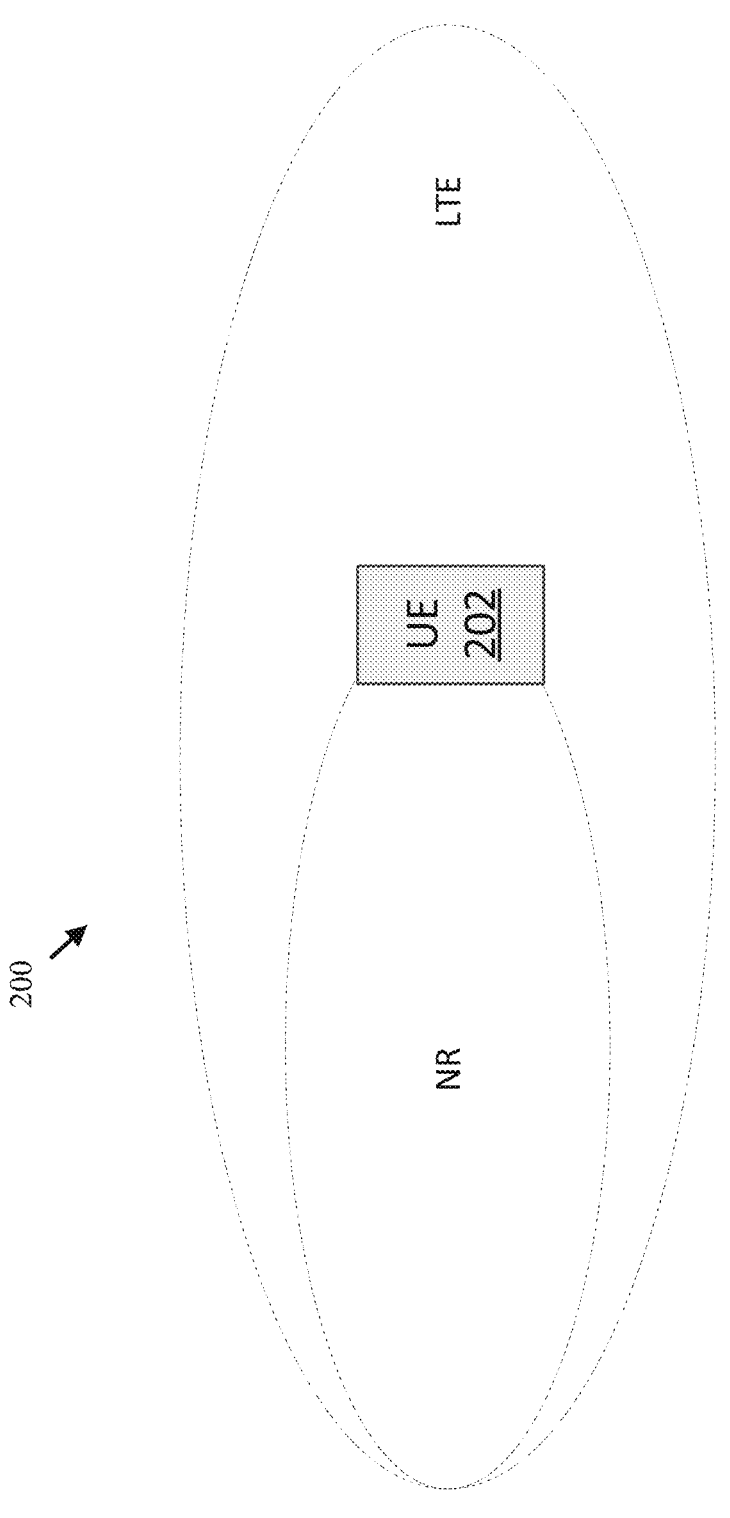
FIG. 2 is a diagram of a coverage area, according to an embodiment.

FIG. 2 is a diagram of a coverage area 200, according to an embodiment. The coverage area 200 includes an LTE range and an NR range. The UE 202 that supports dual connectivity may camp on (e.g., connect to) both an NR cell and an LTE cell, thereby being able to utilize both the NR cell and the LTE cell for transmitting uplink data and receiving downlink data. However, as the UE moves within the coverage area 200, various parameters may change for transmitting uplink data on the NR cell and the LTE cell. For example, as the UE approaches or traverses an edge of the NR range and becomes more distant from the NR base station, the uplink connection in the NR cell may deteriorate and throughput may decrease. Provided herein are systems and methods for dynamically assigning an uplink data flow configuration for transmitting uplink data on the LTE cell and the NR cell. The systems and methods may determine reference signal received powers (RSRPs) of the LTE cell and the NR cell, and then may use the values of the RSRPs to dynamically assign various uplink data flow configurations. The RSRPs may be measured by the UE and signaled to the system (or signaled to the corresponding base station and reported to the system).

Figure 3:
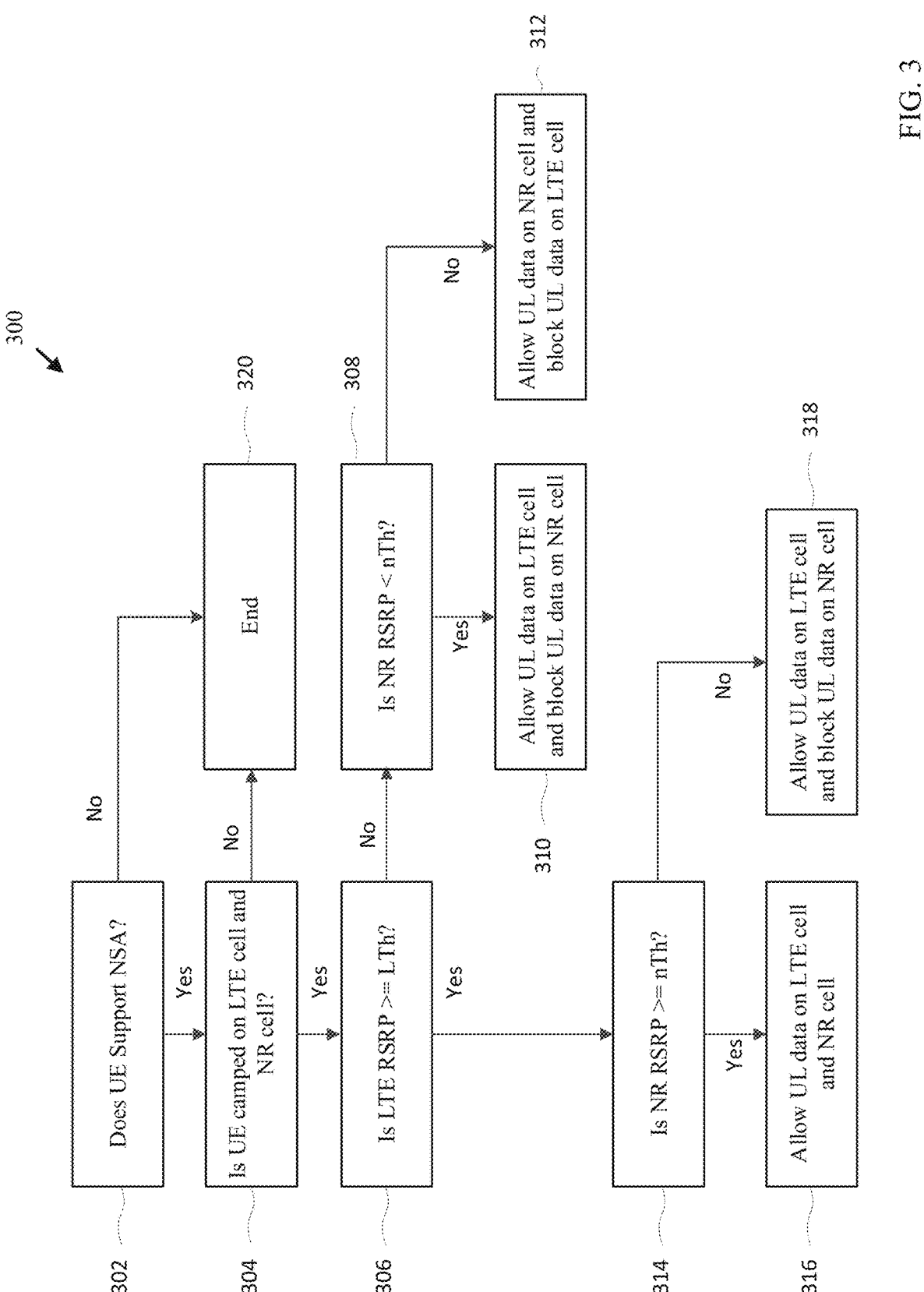
FIG. 3 is a flowchart of a method for assigning an uplink data flow configuration, according to an embodiment.

FIG. 3 is a flowchart of a method for assigning an uplink data flow configuration, according to an embodiment. The method of FIG. 3 may be performed by a system (e.g., server, computing device, etc.), such as a processing device in the NR base station (e.g., gNB) or the LTE base station (e.g., eNB). Referring to FIG. 3, in operation 302, the system determines whether the UE supports non-standalone (NSA) operation. For example, in operation 302, the system may determine whether the UE supports EN-DC. When the system determines that the UE does not support NSA operation, the method ends at operation 320. When the system determines that the UE does support the NSA operation, in operation 304, the system determines whether the UE is camped on an LTE cell and an NR cell. When the system determines that the UE is not camped on the LTE cell, not camped on the NR cell, or not camped on either cell, the method ends at operation 320. Alternatively, the method may continue repeatedly or periodically perform operation 304 until it is determined that the UE is camped on both the LTE cell and the NR cell.

When the system determines that the UE is camped on both the LTE cell and the NR cell, in operation 306, the system determines whether an LTE RSRP is greater than or equal to an LTE RSRP threshold (LTh). When the system determines that the LTE RSRP is not greater than or equal to the LTE RSRP threshold, in operation 308, the system determines whether an NR RSRP is less than an NR RSRP threshold (nTh). When the system determines that the NR RSRP is less than the NR RSRP threshold, in operation 310, the system assigns an uplink data flow configuration such that uplink data is allowed on the LTE cell and is blocked on the NR cell. When the system determines that the NR RSRP is not less than the NR RSRP threshold, in operation 312, the system assigns an uplink data flow configuration such that uplink data is allowed on the NR cell and is blocked on the LTE cell.

Referring back to operation 306, when the system determines that the LTE RSRP is greater than or equal to the LTE RSRP threshold, in operation 314, the system determines whether an NR RSRP is greater than or equal to the NR RSRP threshold. When the system determines that the NR RSRP is greater than or equal to the NR RSRP threshold, in operation 316, the system assigns an uplink data flow configuration such that uplink data is allowed on the NR cell and on the LTE cell. When the system determines that the NR RSRP is not greater than or equal to the NR RSRP threshold, in operation 318, the system assigns an uplink data flow configuration such that uplink data is allowed on the LTE cell and is blocked on the NR cell.

Table 1 shows an example of uplink data flow configurations.

TABLE 1

| LTE RSRP | NR RSRP | LTE Downlink | LTE Uplink | NR Downlink | NR Uplink |
|---|---|---|---|---|---|
| >=LTh | >=nTh | Allowed | Allowed | Allowed | Allowed |
| >=LTh | <nTh | Allowed | Allowed | Allowed | Blocked |
| <LTh | >=nTh | Allowed | Blocked | Allowed | Allowed |
| <LTh | <nTh | Allowed | Allowed | Allowed | Blocked |

The order of the operations shown in FIG. 3 are not limiting and may be performed in alternative orders in other embodiments. For example, the system may first make determinations regarding the NR RSRP and then make determinations regarding the LTE RSRP. The system may also presume that the UE is camped on the LTE cell and the NR cell, and thus operations 302 and 304 may be omitted.

As various parameters of the UE operation within the network environment change while the UE is camped on the LTE cell and the NR cell, it may be desirable to adjust the LTE RSRP threshold and the NR RSRP threshold. That is, as the UE moves around the coverage area and gets closer or farther to the NR or LTE base stations, channel quality or block error rate (BLER) may change. In such cases, the RSRP thresholds should reflect these changes. For example, if the UE experiences high BLER over the NR uplink connection, then a higher RSRP is required to reduce transmission errors. According to various embodiments, the system may implement a method, such as a machine learning (ML) method, for dynamically adjusting the RSRP thresholds based on channel quality, as is described in FIGS. 4 and 5 below.

Figure 4:
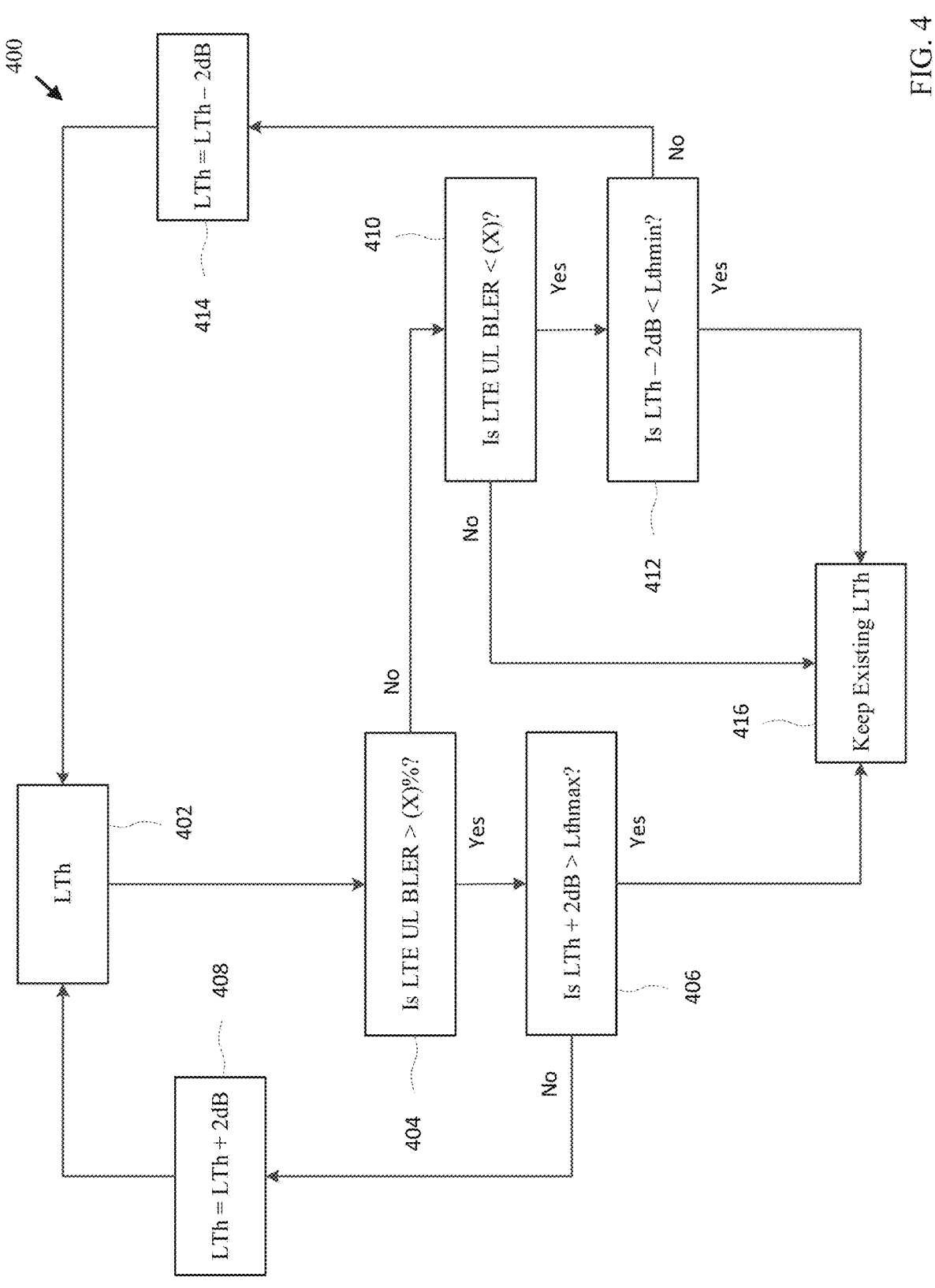
FIG. 4 is a flowchart of a method for adjusting a long term evolution (LTE) reference signal received power (RSRP) threshold, according to an embodiment.

FIG. 4 is a flowchart of a method for adjusting an LTE RSRP threshold, according to an embodiment. The methods of FIGS. 4 and 5 may be performed by a system (e.g., server, computing device, etc.), such as a processing device in the LTE core network or an external server. The system may be the same system that performs the method of FIG. 3, or may be a distinct system that updates the thresholds used by the system of FIG. 3. Furthermore, the methods of FIGS. 4 and 5 may be performed on a per session basis, i.e., may be initiated for each session (whenever a UE equipment powers on and connects to the network) and terminate when the session ends.

Referring to FIG. 4, in operation 402, the LTE RSRP threshold (LTh) is read or determined for a UE. The LTE RSRP threshold may be set according to a predetermined value, such as a default initial value input or set by a user or network operator, and may be the same value each time the method of FIG. 4 is initiated (i.e., for each session).

In operation 404, the system determines whether the LTE uplink BLER for the UE is greater than an error threshold percentage X. The system may obtain the BLER from the LTE base station. The threshold percentage X may be a predefined input threshold set by a user (e.g., network operator). When the system determines that the LTE uplink BLER is greater than the threshold percentage X, in operation 406, the system determines whether the LTE RSRP threshold increased by a predetermined value (e.g., 2 decibels (dB)) is greater than an LTE RSRP threshold maximum (LThmax). The LTE RSRP threshold maximum may be a predefined input threshold set by a user (e.g., network operator). The value of 2 dB is an example iteration value, and other appropriate values will be understood by those of skill in the art from the disclosure herein. When the system determines that the LTE RSRP threshold plus 2 dB (or any other iteration value) is not greater than the LTE RSRP threshold maximum, in operation 408, the system sets the LTE RSRP threshold to be the previous value of the LTE RSRP threshold plus 2 dB (or any other iteration value). When the system determines that the LTE RSRP threshold plus 2 dB is greater than the LTE RSRP threshold maximum, in operation 416, the system maintains the existing LTE RSRP threshold.

Referring back to operation 404, when the system determines that the LTE uplink BLER is not greater than the threshold percentage X, in operation 410, the system determines whether the LTE uplink BLER is less than the threshold percentage X. When the system determines that the LTE uplink BLER is not less than the threshold percentage X (i.e., the system determines that the LTE uplink BLER is equal to the threshold percentage X), in operation 416, the system determines to maintain the existing LTE RSRP threshold. When the system determines that the LTE uplink BLER threshold is less than the threshold percentage X, in operation 412, the system determines whether the LTE RSRP threshold minus a predetermined value (e.g., 2 dB) is less than an LTE RSRP threshold minimum (LThmin). The value of 2 dB is an example iteration value, and other appropriate values will be understood by those of skill in the art from the disclosure herein. The LTE RSRP threshold minimum may be a predefined input threshold set by a user (e.g., network operator). When the system determines that the LTE RSRP threshold minus 2 dB (or any other iteration value) is less than the LTE RSRP threshold minimum, in operation 416, the system determines to maintain the existing LTE RSRP threshold. When the system determines that the LTE RSRP threshold minus 2 dB (or any other iteration value) is not less than the LTE RSRP threshold minimum, in operation 414, the system sets the LTE RSRP threshold to be the previous value of the LTE RSRP threshold minus 2 dB (or any other iteration value). Thus, the LTE RSRP threshold may be dynamically adjusted according to system conditions.

The method of FIG. 4 may be performed continuously throughout a session, periodically in accordance with pre-determined time intervals, and/or based on a predetermined triggering event.

Figure 5:
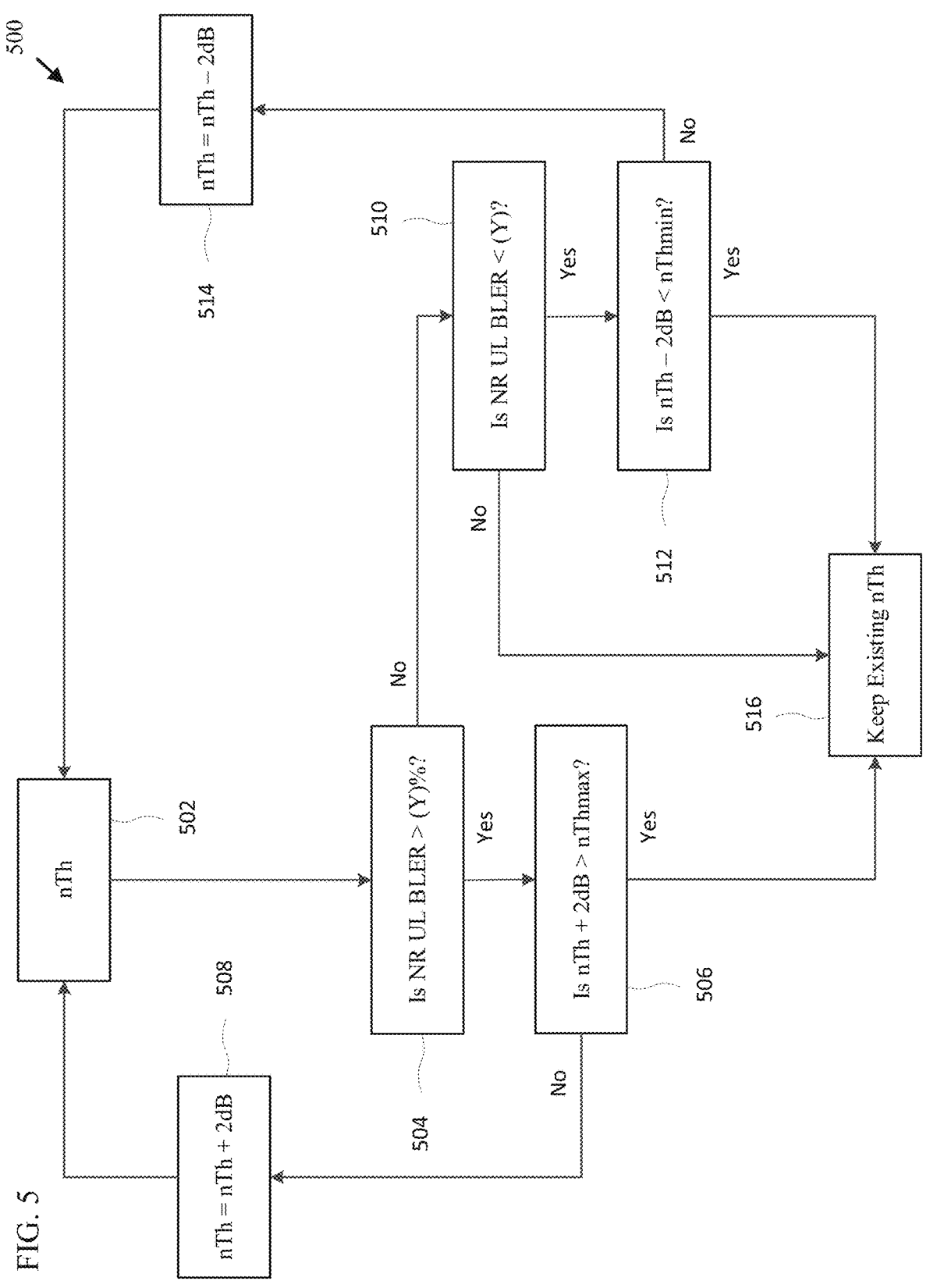
FIG. 5 is a flowchart of a method for adjusting a new radio (NR) RSRP threshold, according to an embodiment.

FIG. 5 is a flowchart of a method for adjusting an NR RSRP threshold, according to an embodiment. Referring to FIG. 5, in operation 502, the NR RSRP threshold (nTh) is read or determined for a UE. The NR RSRP threshold may be set according to a predetermined value, such as a default initial value input or set by a user or network operator, and may be the same value each time the method of FIG. 4 is initiated (i.e., for each session). Further, the initial nTh may be the same as or different from the initial LTh. In operation 504, the system determines whether the NR uplink block error rate (BLER) for the UE is greater than an error threshold percentage Y. The threshold percentage Y may be a predefined input threshold set by a user (e.g., network operator). The threshold percentage Y may be the same as or different from the threshold percentage X. When the system determines that the NR uplink BLER is greater than the threshold percentage Y, in operation 506, the system determines whether the NR RSRP threshold increased by a predetermined value (e.g., 2 dB) is greater than an NR RSRP threshold maximum (nThmax). The NR RSRP threshold maximum may be a predefined input threshold set by a user (e.g., network operator). Further, the NR RSRP threshold maximum may be the same as or different from (e.g., less than or greater than) the LTE RSRP threshold maximum. The value of 2 dB is an example iteration value, and other appropriate values will be understood by those of skill in the art from the disclosure herein. When the system determines that the NR RSRP threshold plus 2 dB (or any other iteration value) is not greater than the NR RSRP threshold maximum, in operation 508, the system sets the NR RSRP threshold to be the previous value of the NR RSRP threshold plus 2 dB (or any other iteration value). When the system determines that the NR RSRP threshold plus 2 dB is greater than the NR RSRP threshold maximum, in operation 516, the system maintains the existing NR RSRP threshold.

Referring back to operation 504, when the system determines that the NR uplink BLER is not greater than the threshold percentage Y, in operation 510, the system determines whether the NR uplink BLER is less than the threshold percentage Y. When the system determines that the NR uplink BLER is not less than the threshold percentage Y (i.e., the system determines that the NR uplink BLER is equal to the threshold percentage Y), in operation 516, the system determines to maintain the existing NR RSRP threshold. When the system determines that the NR uplink BLER threshold is less than the threshold percentage Y, in operation 512, the system determines whether the NR RSRP threshold minus a predetermined value (e.g., 2 dB) is less than an NR RSRP threshold minimum (nThmin). The value of 2 dB is an example iteration value, and other appropriate values will be understood by those of skill in the art from the disclosure herein. The NR RSRP threshold minimum may be a predefined input threshold set by a user (e.g., network operator). Further, the NR RSRP threshold minimum may be the same as or different from (e.g., less than or greater than) the LTE RSRP threshold minimum. When the system determines that the NR RSRP threshold minus 2 dB (or any other iteration value) is less than the NR RSRP threshold minimum, in operation 516, the system determines to maintain the existing NR RSRP threshold. When the system determines that the NR RSRP threshold minus 2 dB (or any other iteration value) is not less than the NR RSRP threshold minimum, in operation 514, the system sets the NR RSRP threshold to be the previous value of the NR RSRP threshold minus 2 dB (or any other iteration value). Thus, the NR RSRP threshold may be dynamically adjusted according to system conditions.

The method of FIG. 5 may be performed continuously throughout a session, periodically in accordance with pre-determined time intervals, and/or based on a predetermined triggering event.

Figure 6:
FIG. 6 is a flowchart for a method of assigning a data uplink configuration, according to an embodiment.
Figure 6:
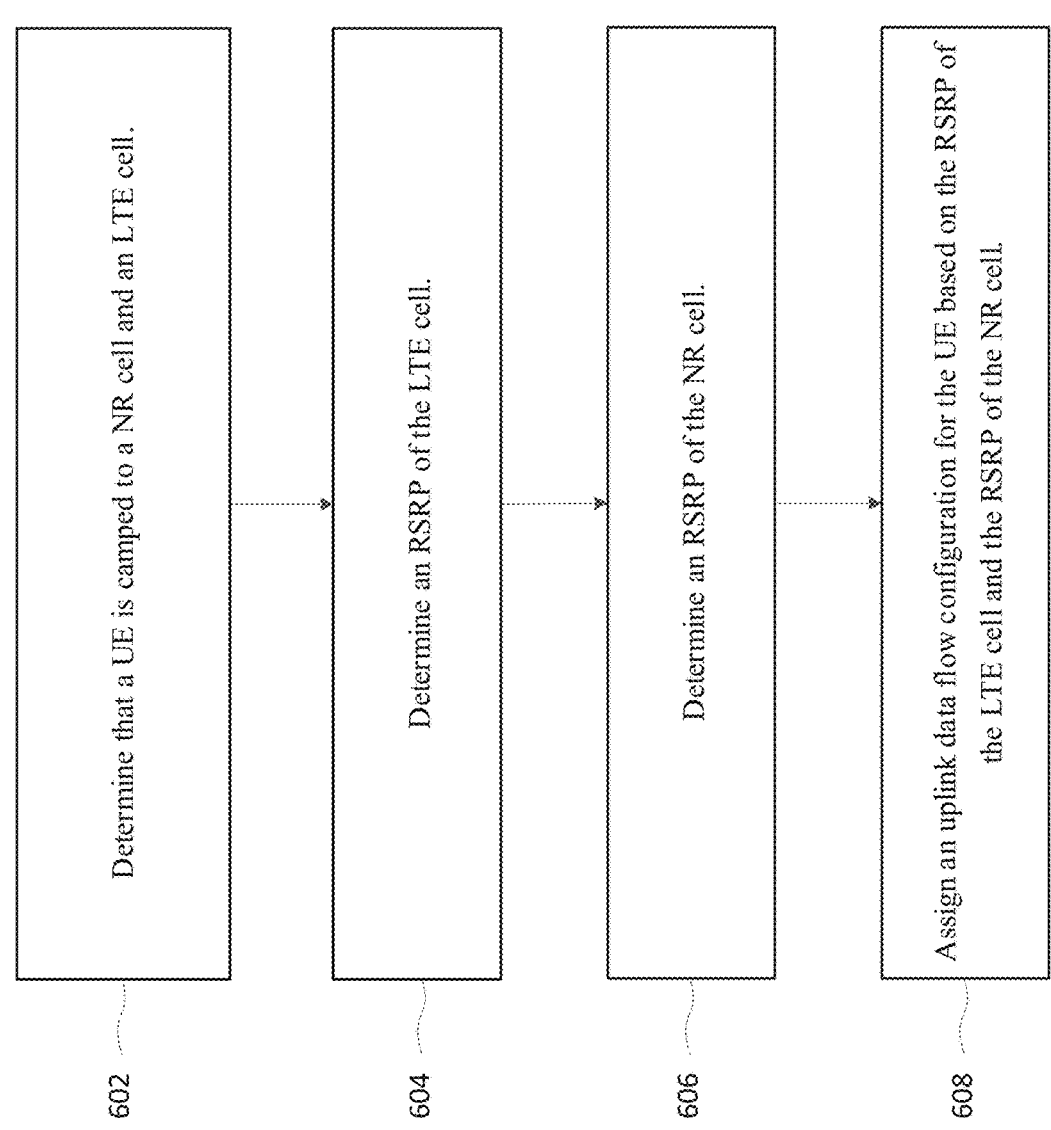

FIG. 6 is a flowchart 600 for a method of assigning a data uplink configuration, according to an embodiment. The method of FIG. 6 may be performed by a system (e.g., server, computing device, etc.), such as a processing device in the NR base station or the LTE base station. In operation 602, the system determines that a UE is camped on an NR cell and to an LTE cell. In operation 604, the system determines an RSRP of the LTE cell. In operation 606, the system determines an RSRP of the NR cell. In operation 608, the system assigns an uplink data flow configuration for the UE based on the RSRP of the LTE cell and the RSRP of the NR cell. In this case, the system may assign the uplink data flow configuration in a manner similar to that described above with reference to FIG. 3. To this end, the system may receive or obtain threshold values for the UE that are dynamically adjusted throughout a communication session of the UE, in accordance with the methods of FIGS. 4 and 5.

Figure 7:
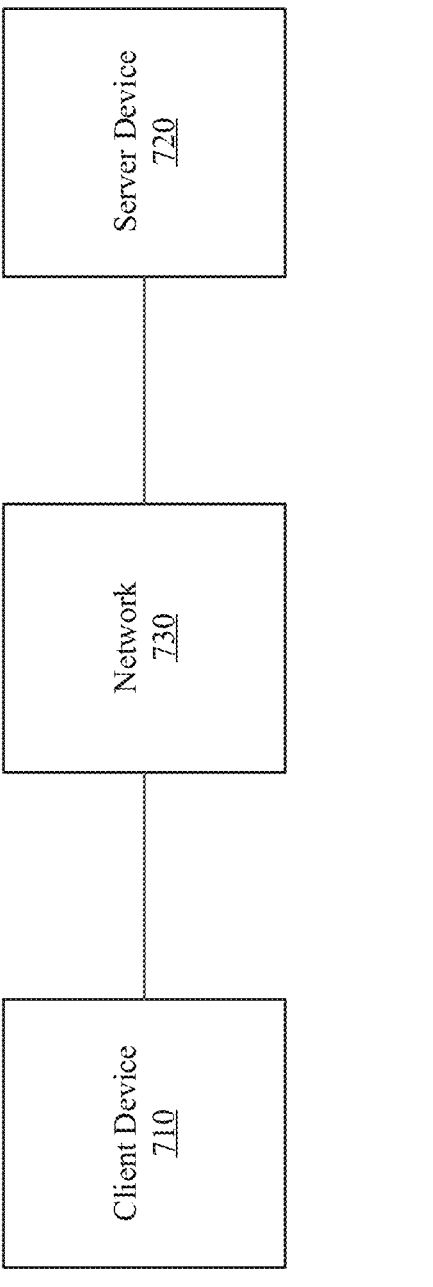
FIG. 7 is a diagram of a system according to an embodiment.

FIG. 7 is a diagram of a system according to an embodiment. FIG. 7 includes a user device 710, a server device 720, and a network 730. The user device 710 and the server device 720 may interconnect via wired connections, wireless connections, or a combination of wired and wireless connections.

The user device 710 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 720 includes one or more devices. For example, the server device 720 may be a server device, a computing device, or the like.

The network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

In accordance with an embodiment, the client device 710 may correspond to a UE, the network 730 may correspond to an LTE RAN and a 5G RAN, and the server device 720 may correspond to the systems described above.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) may perform one or more functions described as being performed by another set of devices.

Figure 8:
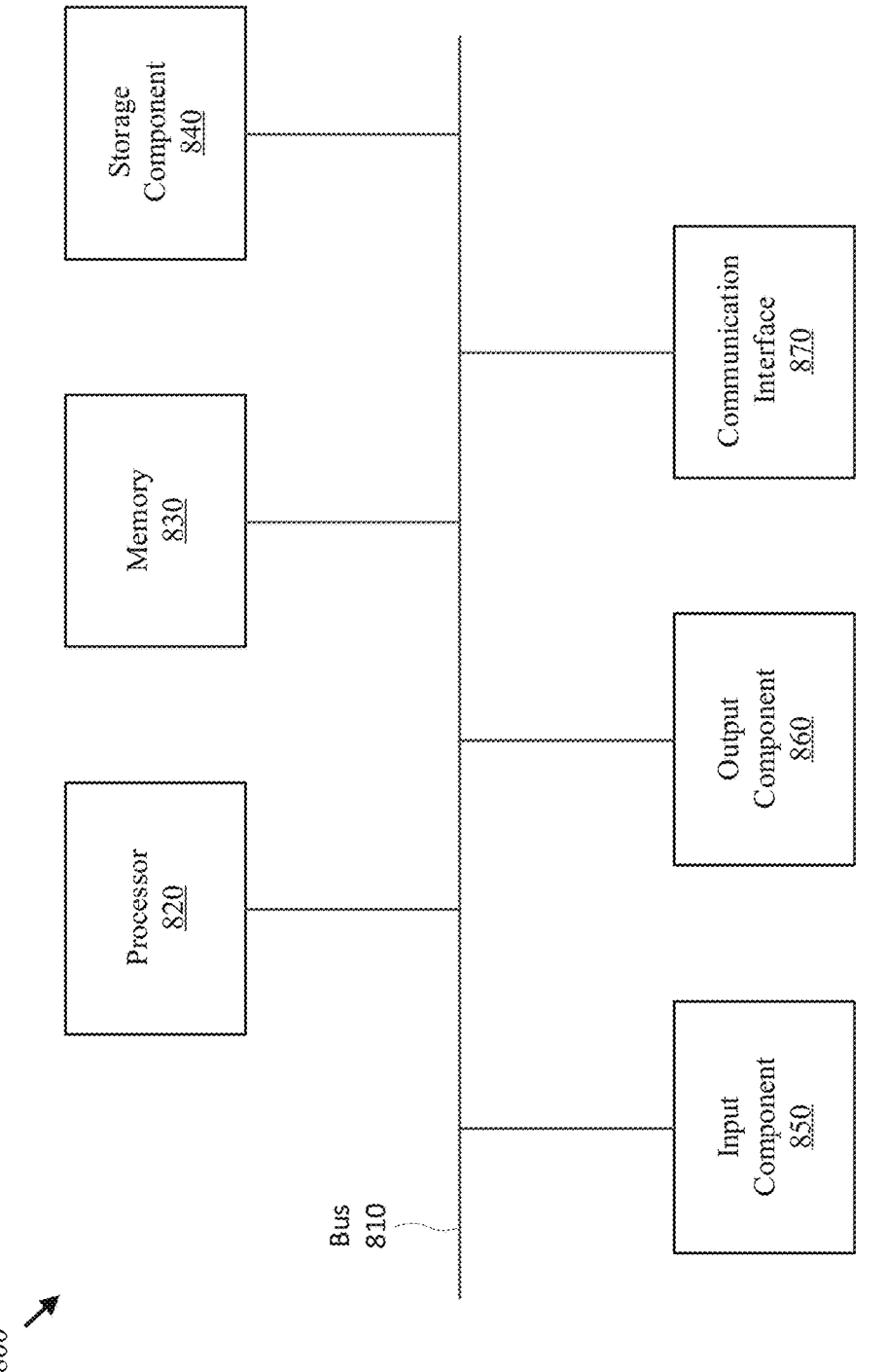
FIG. 8 is a diagram of components of one or more devices of FIG. 7 according to an embodiment.

FIG. 8 is a diagram of components of one or more devices of FIG. 7 according to an embodiment. Device 800 may correspond to the user device 110 and/or the server device 120.

As shown in FIG. 8, the device 800 may include a bus 810, a processor 820, a memory 830, a storage component 840, an input component 850, an output component 860, and a communication interface 870.

The bus 810 includes a component that permits communication among the components of the device 800. The processor 820 is implemented in hardware, firmware, or a combination of hardware and software. The processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 820 includes one or more processors capable of being programmed to perform a function.

The memory 830 includes a random access memory (RAM), a read only memory (ROM), and/or another type of dynamic or static storage device (e.g., a flash memory, a magnetic memory, and/or an optical memory) that stores information and/or instructions for use by the processor 820.

The storage component 840 stores information and/or software related to the operation and use of the device 800. For example, the storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 850 includes a component that permits the device 800 to receive information, such as via user input (e.g., a touch screen display, a keyboard, a keypad, a mouse, a button, a switch, and/or a microphone). The input component 850 may include a sensor for sensing information (e.g., a global positioning system (GPS) component, an accelerometer, a gyroscope, and/or an actuator).

The output component 860 includes a component that provides output information from the device 800 (e.g., a display, a speaker, and/or one or more light-emitting diodes (LEDs)).

The communication interface 870 includes a transceiver-like component (e.g., a transceiver and/or a separate receiver and transmitter) that enables the device 800 to communicate with other devices, such as via a wired connection, a wireless connection, or a combination of wired and wireless connections. The communication interface 870 may permit device 800 to receive information from another device and/or provide information to another device. For example, the communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

The device 800 may perform one or more processes described herein. The device 800 may perform operations based on the processor 820 executing software instructions stored by a non-transitory computer-readable medium, such as the memory 830 and/or the storage component 840. A computer-readable medium is defined herein as a non-transitory memory device. A memory device includes memory space within a single physical storage device or memory space spread across multiple physical storage devices.

Software instructions may be read into the memory 830 and/or the storage component 840 from another computer-readable medium or from another device via the communication interface 870. When executed, software instructions stored in the memory 830 and/or storage component 840 may cause the processor 820 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
determining that a user equipment (UE) is camped on a new radio (NR) cell and to a long term evolution (LTE) cell;
determining a reference signal received power (RSRP) of the LTE cell;
determining an RSRP of the NR cell;
assigning an uplink data flow configuration for the UE based on threshold determinations with respect to the RSRP of the LTE cell and the RSRP of the NR cell,
wherein the threshold determinations are based on at least one RSRP threshold value of at least one of the LTE cell and the NR cell, and
wherein the method further comprises adjusting dynamically the at least one RSRP threshold value in response to an obtained block error rate (BLER) value being not equal to an error threshold percentage.

2. The method of claim 1, wherein the uplink data flow configuration for the UE causes the UE to be allowed to transmit uplink data on the NR cell when the RSRP of the NR cell is greater than or equal to an NR RSRP threshold.

3. The method of claim 2, further comprising adjusting the NR RSRP threshold based on a block error rate (BLER) of the NR cell.

4. The method of claim 1, wherein the uplink data flow configuration for the UE causes the UE to be blocked from transmitting uplink data on the NR cell when the RSRP of the NR cell is less than an NR RSRP threshold.

5. The method of claim 1, wherein the uplink data flow configuration for the UE causes the UE to be allowed to transmit uplink data on the LTE cell when the RSRP of the LTE cell is greater than or equal to an LTE RSRP threshold.

6. The method of claim 5, further comprising adjusting the LTE RSRP threshold based on a block error rate (BLER) of the LTE cell.

7. The method of claim 1, wherein the uplink data flow configuration for the UE causes the UE to be blocked from transmitting uplink data on the LTE cell when the RSRP of the LTE cell is less than an LTE RSRP threshold.

8. A system, comprising:
a memory configured to store instructions; and
one or more processors configured to execute the instructions to:
determine that a user equipment (UE) is camped on a new radio (NR) cell and to a long term evolution (LTE) cell;
determine a reference signal received power (RSRP) of the LTE cell;
determine an RSRP of the NR cell;
assign an uplink data flow configuration for the UE based on threshold determinations with respect to the RSRP of the LTE cell and the RSRP of the NR cell,
wherein the threshold determinations are based on at least one RSRP threshold value of at least one of the LTE cell and the NR cell, and
wherein the one or more processors are further configured to adjust dynamically the at least one RSRP threshold value in response to an obtained block error rate (BLER) value being not equal to an error threshold percentage.

9. The system of claim 8, wherein the uplink data flow configuration for the UE causes the UE to be allowed to transmit uplink data on the NR cell when the RSRP of the NR cell is greater than or equal to an NR RSRP threshold.

10. The system of claim 9, wherein the one or more processors are further configured to execute the instructions to adjust the NR RSRP threshold based on a block error rate (BLER) of the NR cell.

11. The system of claim 8, wherein the uplink data flow configuration for the UE causes the UE to be blocked from transmitting uplink data on the NR cell when the RSRP of the NR cell is less than an NR RSRP threshold.

12. The system of claim 8, wherein the uplink data flow configuration for the UE causes the UE to be allowed to transmit uplink data on the LTE cell when the RSRP of the LTE cell is greater than or equal to an LTE RSRP threshold.

13. The system of claim 12, wherein the one or more processors are further configured to execute the instructions to adjust the LTE RSRP threshold based on a block error rate (BLER) of the LTE cell.

14. The system of claim 8, wherein the uplink data flow configuration for the UE causes the UE to be blocked from transmitting uplink data on the LTE cell when the RSRP of the LTE cell is less than an LTE RSRP threshold.

15. A non-transitory computer-readable medium storing instructions, the instructions comprising: one or more instructions that, when executed by one or more processors of a wireless communication system, cause the one or more processors to:
determine that a user equipment (UE) is camped on a new radio (NR) cell and to a long term evolution (LTE) cell;
determine a reference signal received power (RSRP) of the LTE cell;
determine an RSRP of the NR cell;
assign an uplink data flow configuration for the UE based on threshold determinations with respect to the RSRP of the LTE cell and the RSRP of the NR cell,
wherein the threshold determinations are based on at least one RSRP threshold value of the LTE cell and the NR cell, and
wherein the method further comprises adjusting dynamically the at least one RSRP threshold value in response to an obtained block error rate (BLER) value being not equal to an error threshold percentage.

16. The non-transitory computer-readable medium of claim 15, wherein the uplink data flow configuration for the UE causes the UE to be allowed to transmit uplink data on the NR cell when the RSRP of the NR cell is greater than or equal to an NR RSRP threshold.

17. The non-transitory computer-readable medium of claim 16, wherein the instructions, when executed, further cause the one or more processors to adjust the NR RSRP threshold based on a block error rate (BLER) of the NR cell.

18. The non-transitory computer-readable medium of claim 15, wherein the uplink data flow configuration for the UE causes the UE to be blocked from transmitting uplink data on the NR cell when the RSRP of the NR cell is less than an NR RSRP threshold.

19. The non-transitory computer-readable medium of claim 15, wherein the uplink data flow configuration for the UE causes the UE to be allowed to transmit uplink data on the LTE cell when the RSRP of the LTE cell is greater than or equal to an LTE RSRP threshold.

20. The non-transitory computer-readable medium of claim 19, wherein the instructions, when executed, further cause the one or more processors to adjust the LTE RSRP threshold based on a block error rate (BLER) of the LTE cell.

* * * * *